United States Patent [19]

Sakowski

[11] 4,399,117
[45] Aug. 16, 1983

[54] PRODUCTION OF NEUTRAL CALCIUM HYPOCHLORITE FROM ITS DIBASIC SALT

[75] Inventor: Walter J. Sakowski, Cleveland, Tenn.

[73] Assignee: Olin Corporation, New Haven, Conn.

[21] Appl. No.: 345,869

[22] Filed: Feb. 4, 1982

[51] Int. Cl.³ .............................................. C01B 11/06
[52] U.S. Cl. .................................................... 423/474
[58] Field of Search ........................................ 423/474

[56] References Cited

U.S. PATENT DOCUMENTS

| | | | |
|---|---|---|---|
| 1,583,421 | 5/1926 | Pistol | 423/474 |
| 2,368,042 | 1/1945 | Robson | 423/474 |
| 3,950,499 | 4/1976 | Miyashin | 423/474 |
| 3,956,471 | 5/1976 | Pullman | 423/474 |

Primary Examiner—Brian E. Hearn
Attorney, Agent, or Firm—James B. Haglind; Donald F. Clements

[57] ABSTRACT

A process for producing neutral calcium hypochlorite comprises admixing lime, an alkali metal hypochlorite and dibasic calcium hypochlorite crystals in a mixing zone slurry. The mixing zone slurry is reacted with chlorine to form a paste of neutral calcium hypochlorite. The paste is then separated into a cake of neutral calcium hypochlorite and a paste liquor. A slurry of lime is fed to a crystallizer to react with the paste liquor to form a slurry of dibasic calcium hypochlorite crystals in a mother liquor. Crystals of dibasic calcium hypochlorite are then separated from the dibasic mother liquor and recycled to the mixing zone. The process of the present invention provides an efficient method of recovering calcium hypochlorite values from process liquors while reducing energy costs expended in the recovery. The process further provides rapid recovery of dibasic calcium hypochlorite for reuse in a neutral calcium hypochlorite process by optimizing separation rates.

9 Claims, 3 Drawing Figures

PRODUCTION OF NEUTRAL CALCIUM HYPOCHLORITE FROM ITS DIBASIC SALT

This invention relates to the manufacture of calcium hypochlorite. More particularly, this invention relates to an improved continuous process for the manufacture of calcium hypochlorite. Calcium hypochlorite is a commercial bleaching and sanitizing agent used particularly in the disinfection of swimming pools.

Calcium hypochlorite is produced by the reaction of calcium compounds such as an aqueous slurry of lime with a chlorinating agent, for example, chlorine. The chlorination reaction is conducted until crystals of a hypochlorite product such as neutral calcium hypochlorite dihydrate are produced in a hypochlorite mother liquor. After separation of the crystalline hypochlorite product, it is necessary to treat the mother liquor to recover the calcium hypochlorite values or to decompose hypochlorite ions before disposal of the solution.

In U.S. Pat. No. 3,895,099, issued July 15, 1975, to W. J. Sakowski, after removal of the calcium hypochlorite dihydrate crystals, the mother liquor remaining is treated with an alkali metal hydroxide to recover a lime slurry.

U.S. Pat. No. 4,196,184, issued Apr. 1, 1980, to W. J. Sakowski, describes a process in which the mother liquor is reacted with an alkali metal hydroxide at a pH in the range of 12.1 to 12.6 to form a mixture of crystalline hemi-basic calcium hypochlorite and lime.

While the processes of U.S. Pat. No. 3,895,099 and U.S. Pat. No. 4,196,184 recover calcium values from calcium hypochlorite-containing liquors, both processes require evaporation of the filtrate remaining after separation of the lime.

The treatment of calcium hypochlorite containing mother liquors with lime to precipitate dibasic calcium hypochlorite crystals is known as described, for example, in U.S. Pat. Nos. 1,713,669; 1,718,285; and 3,094,380.

U.S. Pat. No. 1,713,669, issued to R. B. MacMullin et al., describes a process in which a lime slurry is chlorinated to precipitate calcium hypochlorite which is separated from a filtrate containing hypochlorite values. The filtrate is treated with lime to precipitate basic calcium hypochlorite which is recycled to make up additional lime slurry.

U.S. Pat. No. 1,718,285, issued to A. George, teaches a process for reacting a sodium hypochlorite solution and lime to produce neutral calcium hypochlorite crystals in a mother liquor. Following the separation of the crystalline product, the mother liquor may be treated with lime to form a basic hypochlorite which can be used to replace an equivalent amount of lime in the next cycle of the process.

Similarly, U.S. Pat. No. 3,094,380, issued to E. A. Bruce, describes the reaction of neutral calcium hypochlorite mother liquor with lime to crystallize dibasic calcium hypochlorite. A cake of dibasic calcium hypochlorite was recovered and chlorinated to produce neutral calcium hypochlorite.

The processes of U.S. Pat. Nos. 1,713,669; 1,718,285; and 3,094,380, however, have insufficient process controls necessary to produce slurries of dibasic calcium hypochlorite crystals whose filtration rates are suitable for use in a continuous commercial calcium hypochlorite process. In addition, the filtrates remaining after recovery of the dibasic crystals have undesirably high concentrations of calcium and hypochlorite ions.

There is presently a need to improve the recovery of calcium values in calcium hypochlorite processes.

It is a primary object of the present invention to provide an improved process for separating dibasic calcium hypochlorite from calcium hypochlorite-containing solutions.

Another object of the invention is to provide an improved process for producing calcium hypochlorite wherein the calcium and hypochlorite values in waste streams are substantially reduced.

A further object of the present invention is to provide a process for recovering calcium and hypochlorite from effluents containing calcium hypochlorite having reduced energy requirements.

These and other objects of the present invention are accomplished in a process for producing neutral calcium hypochlorite which comprises:

(a) admixing lime, an alkali metal hypochlorite and dibasic calcium hypochlorite crystals in a mixing zone to form a mixing zone slurry;

(b) reacting the mixing zone slurry with chlorine to form a paste of neutral calcium hypochlorite;

(c) separating the paste into a cake of neutral calcium hypochlorite and a paste liquor;

(d) reacting the paste liquor with a slurry of lime in a crystallizer to form a slurry of dibasic calcium hypochlorite crystals in a mother liquor;

(e) separating the crystals of dibasic calcium hypochlorite crystals from a dibasic mother liquor; and (f) recycling the dibasic calcium hypochlorite crystals to the mixing zone.

Alkali metal hypochlorites and alkali metal hydroxides are employed as reactants in the present invention and one of the products is an alkali metal chloride. In order to simplify the disclosure, the invention will be described hereinafter in terms of "sodium hypochlorite," "sodium hydroxide" and "sodium chloride". However, those skilled in the art will recognize that any other suitable alkali metal hypochlorite such as potassium hypochlorite or any other suitable alkali metal hydroxide such as potassium hydroxide can serve as a substitute or partial replacement for the corresponding sodium compounds. In this event, one of the products will be potassium chloride. In order to simplify process conditions, it is preferred to employ either all sodium compounds or all potassium compounds. However, the process can also be operated with a mixture of these alkali metal compounds if the efficiency of separating products is not important to the operation.

Figure 1:
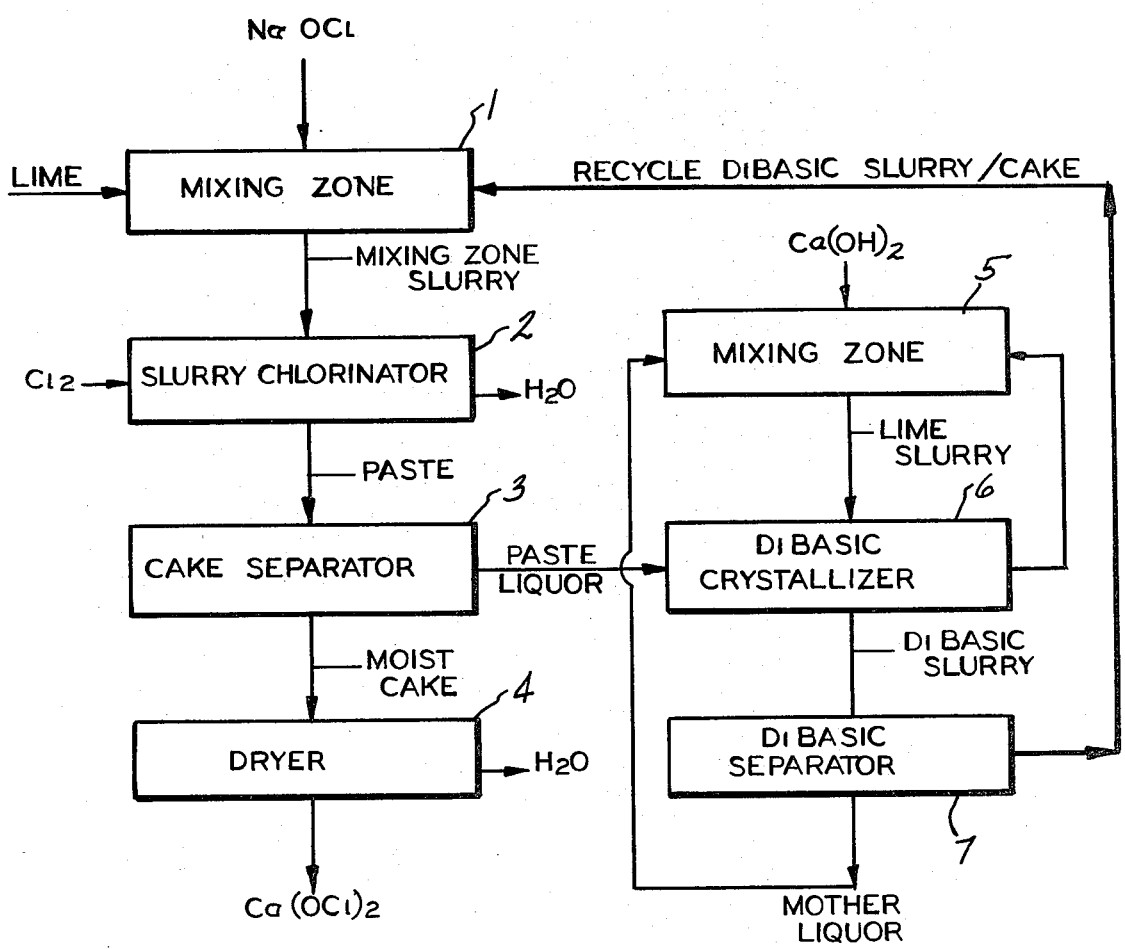
FIG. 1 is a flow sheet of one embodiment of the present invention illustrating the separation and recovery of calcium hypochlorite and the recycle of dibasic calcium hypochlorite slurry.

More in detail, in the process of FIG. 1, lime, sodium hypochlorite and recycle dibasic calcium hypochlorite slurry or cake are admixed in mixing zone 1 to form a mixing zone slurry. Mixing zone 1 is a mixing tank or other suitable vessel having agitation means for blending the various components fed thereto.

The resulting mixing zone slurry is conveyed to slurry chlorinator 2 and reacted with chlorine. Slurry chlorinator 2 is any suitable chlorination apparatus provided with agitation means for maximum contact between chlorine and slurry. It is preferred to employ as slurry chlorinator 2 an evaporator chlorinator which utilizes the chlorination technique described in U.S. Pat. No. 3,241,912, issued to Bernard H. Nicolaisen on Mar. 22, 1966. Temperature within slurry chlorinator 2 is maintained within the range from about 0° to about 35° and preferably from about 20° to about 30° C.

During chlorination of the slurry in slurry chlorinator 2, lime reacts with chlorine to form calcium hypochlorite dihydrate and calcium chloride in accordance with Equation (1):

$$Ca(OH)_2 + Cl_2 \rightarrow \tfrac{1}{2}Ca(ClO)_2 \cdot 2H_2O + \tfrac{1}{2}CaCl_2 \qquad (1)$$

The dibasic calcium hypochlorite present in the slurry chlorinator 2 reacts with chlorine to form neutral calcium hypochlorite in accordance with Equation (2):

$$Ca(OCl)_2 \cdot 2Ca(OH)_2 + 2Cl_2 \rightarrow 2Ca(OCl)_2 + CaCl_2 + 2H_2O \qquad (2)$$

Sodium hypochlorite present in slurry chlorinator 2 reacts with calcium chloride to form additional calcium hypochlorite and sodium chloride in accordance with Equation (3):

$$2NaOCl + CaCl_2 \rightarrow Ca(OCl)_2 + 2NaCl \qquad (3)$$

The primary products of slurry chlorinator 2 are neutral calcium hypochlorite, sodium chloride and water. At start-up of the process it is preferred to fill slurry chlorinator 2 with a slurry or "paste" of calcium hypochlorite solids suspended in an aqueous solution of sodium chloride and calcium hypochlorite, with an excess lime or other alkali concentration in the slurry being less than about 1.0 and preferably less than about 0.50 percent by weight. The rate of feed of mixing zone slurry and chlorine to slurry chlorinator 2 and rate of evaporation of water, if any, are adjusted to maintain the concentration of unreacted lime or other alkali during the reaction below about 1.0 percent. Continuous chlorination of the slurry in this manner causes the formation of coarse calcium hypochlorite crystals which are much more easily separated from paste liquor in cake separator 3 than are calcium hypochlorite crystals separated in a conventional triple salt process or a batch type process.

A portion of the resulting paste produced in slurry chlorinator 2 comprised of solid neutral calcium hypochlorite dihydrate and a paste liquor, which is predominately an aqueous solution of sodium chloride and calcium hypochlorite, is continuously withdrawn from slurry chlorinator 2 and conveyed to cake separator 3.

Cake separator 3 is a filter, centrifuge, or other suitable solid-liquid separating apparatus capable of separating a moist cake of calcium hypochlorite dihydrate crystals from the aqueous solution of sodium chloride and calcium hypochlorite.

Moist cake from cake separator 3 generally contains from about 40 to about 60 percent by weight of calcium hypochlorite dihydrate, from about 2 to about 15 percent by weight of sodium chloride, and from about 40 to about 50 percent by weight of water. Moist cake is generally conveyed to dryer 4 where it is heated to remove most of the water. Dryer 4 is any suitable drying unit or units capable of reducing the moisture content of the calcium hypochlorite cake to the desired level without causing excessive decomposition of the calcium hypochlorite particles.

Generally the water content of the calcium hypochlorite is reduced in dryer 4 to below about 10 percent by weight, for example, in the range from about 0.5 to about 10, preferably from about 0.5 to about 8, and more preferably from about 4.0 to about 8 percent by weight. The calcium hypochlorite content of the dried calcium hypochlorite generally ranges from about 65 to about 85, and preferably from about 65 to about 75 percent by weight. The remainder of the dried calcium hypochlorite is predominately sodium chloride. The dried product is then placed in suitable containers, with or without prior size classification or other processing such as pelletizing, prior to use in water treatment or other utility.

"Paste liquor" (or "paste filtrate" when cake separator 3 is a filter) is an aqueous sodium chloride solution from cake separator 3 which also contains soluble calcium hypochlorite. This paste liquor is conveyed to dibasic crystallizer 6, which is any suitable tank crystallizer provided with agitation means, where the lime slurry from mixing zone 5 reacts with calcium hypochlorite present in the paste liquor in accordance with Equation (4):

$$Ca(OCl)_2 + 2Ca(OH)_2 \rightarrow Ca(OCl)_2 \cdot 2Ca(OH)_2 \qquad (4)$$

This reaction in dibasic crystallizer 6 forms a slurry of dibasic calcium hypochlorite crystals in a dibasic mother liquor, an aqueous solution of sodium chloride and calcium hypochlorite. The resulting slurry is conveyed to dibasic separator 7 which is a solid-liquid separating apparatus such as a filter, centrifuge or other suitable apparatus. in dibasic separator 7, at least a portion of the mother liquor is separated from the dibasic slurry to form a more concentrated slurry or a moist dibasic cake which is recycled to mixing zone 1.

Mother liquor, the aqueous solution of sodium chloride and dibasic calcium hypochlorite recovered in dibasic separator 7, may be utilized as bleach liquor. This mother liquor contains minor amounts of calcium hypochlorite values, for example, from about 3 to about 4 weight percent of $Ca(OCl)_2$. Mother liquor from dibasic separator 7 is preferably recycled to the process as described more fully below.

Figure 2:
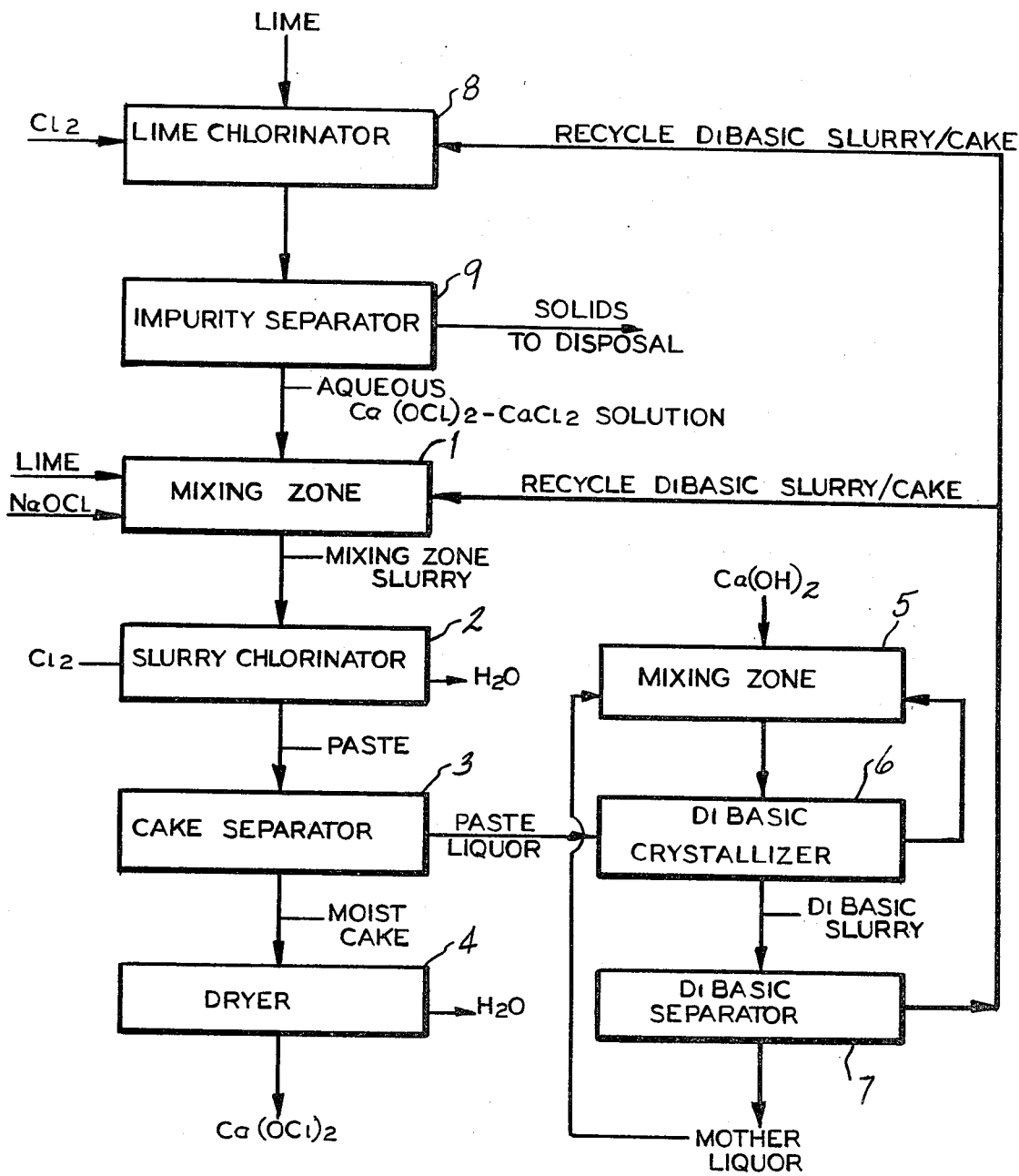
FIG. 2 is a flow sheet showing an additional embodiment of the invention including the embodiment of FIG. 1 as well as steps including lime purification.

In the embodiment of FIG. 2, a portion of the lime used is fed to lime chlorinator 8. Added as an aqueous slurry, the lime is chlorinated to form an aqueous solution of calcium hypochlorite in accordance with the reaction of Equation (1). As previously shown above, impurities in the lime include insoluble impurities such as silica, aluminum salts, iron salts, magnesium salts, magnesia, unburned limestone (calcium carbonate and magnesium carbonate) and other compounds in trace quantities. These impurities present in the lime remain insoluble in the aqueous solution formed in lime chlorinator 8 and form a slurry with the aqueous solution of calcium hypochlorite and calcium chloride. This slurry is conveyed to impurity separator 9, which is a suitable solid-liquid separator such as a filter, centrifuge or the like, where solid impurities are separated. Solid impurities from impurity separator 9 are generally disposed of as solid waste, land fill or the like. The aqueous solution of calcium hypochlorite and calcium chloride from impurity separator 9 is conveyed to mixing zone 1. While the primary function of mixing zone 1 is to effect admixing of the components fed thereto, in the embodiment of FIG. 2, the calcium chloride component of the aqueous solution from impurity separator 9 is reacted in mixing zone 1 with sodium hypochlorite to form an aqueous solution of calcium hypochlorite and sodium chloride in accordance with Equation (3).

A portion of recycle dibasic calcium hypochlorite in an additional embodiment, may be fed to lime chlorinator 8 where it is admixed with lime to form a slurry containing from about 15 to about 20 percent by weight of active lime. This slurry is reacted with chlorine to form a solution of neutral calcium hypochlorite and $CaCl_2$ in accordance with the reaction of Equation (4). Impurities present in the recycle dibasic slurry from dibasic separator 7 remain insoluble and are removed by impurity separator 9 from the aqueous hypochlorite solution.

In a further embodiment, mother liquor recovered from dibasic separator 7 may be used in preparing the lime slurry to be fed to mixing zone 1, mixing zone 5 and/or lime chlorinator 8. Calcium hypochlorite in solution in the mother liquor may in this way be recovered.

In an additional embodiment, a portion of the dibasic calcium hypochlorite slurry from dibasic separator 7 may be used in preparing the lime slurry in mixing zone 5 fed to dibasic crystallizer 6.

Figure 3:
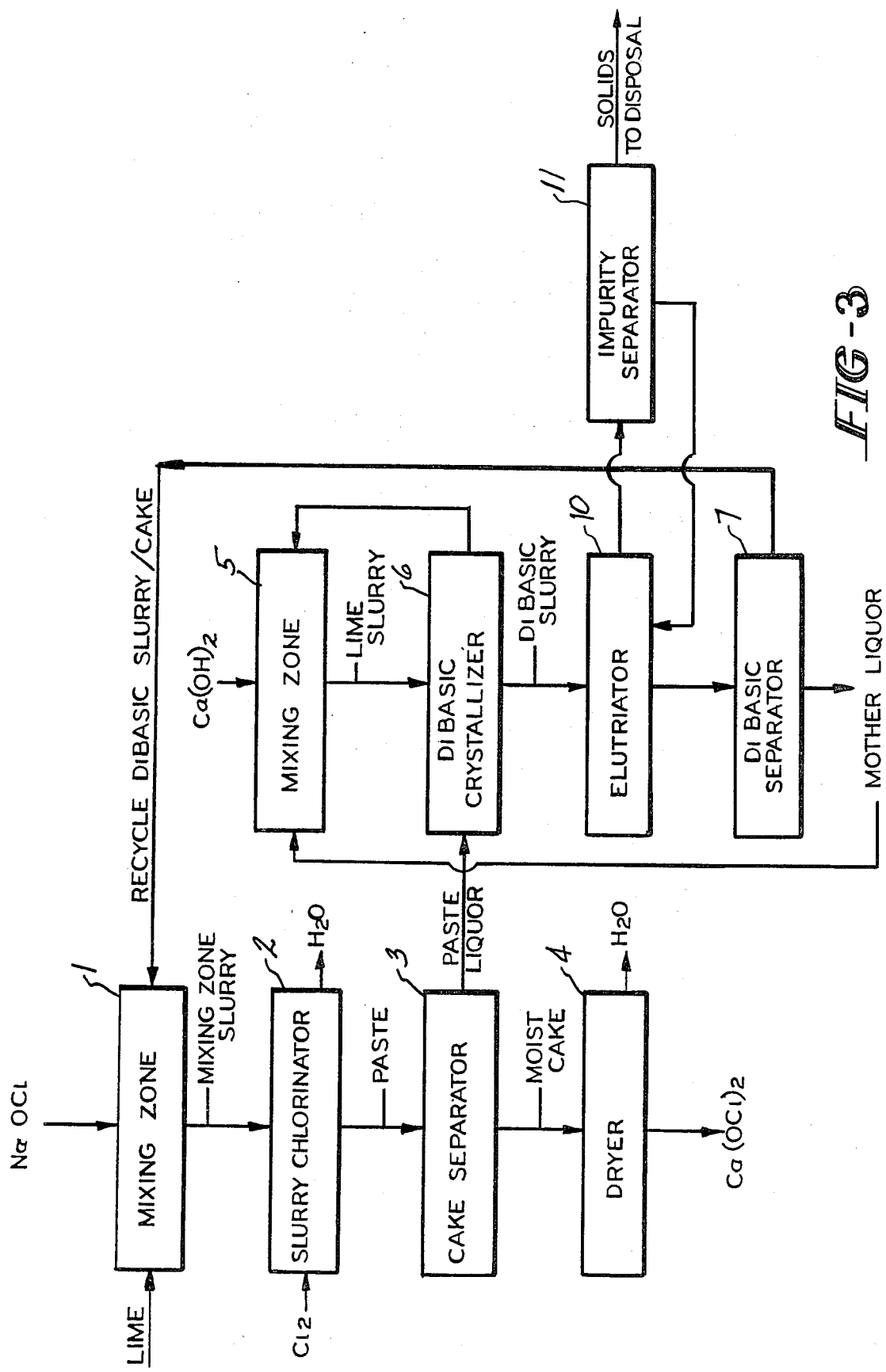
FIG. 3 is a flow sheet showing an additional embodiment for lime purification.

In the additional embodiment illustrated in FIG. 3, the dibasic slurry from the dibasic crystallizer 6 can be passed through elutriator 10 in which the insoluble lime impurities can be removed from a slurry of coarse dibasic crystals. This embodiment provides another means for utilizing less pure limes. The elutriant is a clean filtrate produced in impurity separator 11 which discharges the insoluble impurities to solid wastes or land fill. By varying the amount of dibasic mother liquor in the recycle dibasic slurry added to mixing zone 1, the volume of paste liquor fed to dibasic crystallizer 6 can be varied to permit a variance in the amount of raw lime fed into mixing zone 5. This permits the amount of lime purified to be varied while maintaining a fixed insoluble content in the final calcium hypochlorite product irrespective of the impurity content in the raw lime.

The primary raw materials for the process of this invention are lime, sodium hypochlorite, chlorine and water.

Lime is added to the process at mixing zone 1, mixing zone 5 and/or lime chlorinator 8. One of the advantages of this invention is that relatively impure lime may be utilized to prepare a relatively pure calcium hypochlorite product. For example, lime having an active lime content as low as 85 percent by weight or less may be added to dibasic crystallizer 6 in accordance with the process of this invention and produce a relatively pure calcium hypochlorite product. Generally the active lime content of the lime fed to lime chlorinator 8 and/or mixing zone 1 and mixing zone 5 ranges from about 85 to about 100 percent, and preferably from about 90 to about 97 percent by weight of active lime. Lime impurities of the type described above may range from about 0 to about 15 percent and generally from about 3 to about 10 percent by weight of the lime.

Typical illustrative specifications for a preferred lime feed and for an acceptable lime feed are as follows:

| Component | Preferred | Acceptable |
|---|---|---|
| $Ca(OH)_2$ min. % | 95.0 | 85 |
| $CaCO_3$ max. % | 1.0 | 3.0 |
| MgO max. % | 0.5 | 3.5 |

| Component | Preferred | Acceptable |
|---|---|---|
| $SiO_2$ max. % | 0.5 | 2.5 |
| $FeO_3 + Al_2O_3$ max. % | 0.5 | 1.5 |
| $CaSO_4$ max. % | 0.5 | 1.5 |

The average particle size of lime feed to the process generally is substantially all $-325$ mesh (wet screen analysis), but particles up to about $-200$ mesh may be employed, if desired.

When the impurity content of lime in the lime feed is greater than about 5 percent by weight, it may be desirable to add a lime purification step to remove impurities from at least a portion of the lime fed to mixing zone 1.

Sodium hypochlorite, added to mixing zone 1 in FIG. 1, may be prepared by chlorinating an aqueous solution of sodium hydroxide in a suitable agitated chlorinator reactor (not shown). The sodium hydroxide concentration in the aqueous solution used to make sodium hypochlorite for feed to mixing zone 1 of FIG. 1 ranges from about 20 to about 75 and preferably from about 35 to about 55 percent by weight.

Chlorine is added to slurry chlorinator 2 as well as lime chlorinator 8 in either gaseous or liquid form. The chlorination reactions are carried out preferably in an evaporator-type chlorinator of the type described above.

In the embodiments of FIG. 1, where lime and sodium hypochlorite solution are added to mixing zone 1, the resulting mixing zone slurry has a lime concentration ranging from about 1 to about 25 and preferably from about 2 to about 20 weight percent and a sodium hypochlorite concentration ranging from about 1 to about 25 and preferably from about 2 to about 20 percent by weight. In the embodiment of FIG. 2, when all or part of the lime is purified in lime chlorinator 8 and impurity separator 9 to form an aqueous solution of calcium hypochlorite and calcium chloride which is fed to mixing zone 1, the resulting mixing zone slurry has a lime concentration and sodium hypochlorite concentration within the above ranges as well as a concentration of calcium hypochlorite ranging from about 0 to about 30, and preferably from about 10 to about 26 percent by weight. Substantially all of the calcium chloride fed to mixing zone 1 reacts with sodium hypochlorite to form calcium hypochlorite and sodium chloride in accordance with Equation (3).

Dibasic calcium hypochlorite slurry added to mixing zone 1, and/or lime chlorinator 7 and/or mixing zone 5 has a lime concentration of from about 7 to about 10 weight percent, a calcium hypochlorite concentration of from about 7 to about 10 percent by weight and a sodium hypochlorite content of from about 6 to about 9 percent by weight.

The ultimate water content in the mixing zone slurry is controlled by adjusting the water content of the various feed streams to mixing zone 1. For example, the water content of the aqueous solution of calcium hypochlorite and calcium chloride (when lime purification of FIG. 2 is used), the water content of any lime slurry added, the water content of the sodium hypochlorite and the water content of recycled dibasic calcium hypochlorite slurry from dibasic separator 6 are controlled to obtain a mixing zone slurry of the desired concentration range described above.

Slurry chlorinator 2, at start-up, is preferably filled with a slurry of calcium hypochlorite solids suspended in an aqueous solution of sodium chloride. The excess lime or other alkali in the slurry is maintained below about 1.0 and preferably less than about 0.5 percent by weight of the slurry. The feed rate of mixing zone slurry and chlorine to slurry chlorinator 2 and the withdrawal rate of the resulting calcium hypochlorite paste are adjusted to achieve substantially complete chlorination of the calcium values fed to slurry chlorinator 2 in the mixing zone slurry, while maintaining the total alkali concentration in slurry chlorinator 2 preferably below about 1.0 percent by weight of the slurry.

Paste from slurry chlorinator 2 is predominately a slurry of neutral calcium hypochlorite in an aqueous solution of sodium chloride and calcium hypochlorite. The paste contains neutral calcium hypochlorite dihydrate crystals in the concentration of from about 10 to about 35 and preferably from about 15 to about 30 percent by weight. These crystals are predominately rectangular platelets which are only a few microns in thickness, but have substantially equal sides ranging from about 50 to about 300 microns in length with the major portion having sides ranging from about 100 microns to about 250 microns in length. Generally, less than about 10 percent of the crystals are "twin crystals" which entrain paste liquor, which are difficult to separate from the paste liquor, and which are difficult to dry. Since more than about 90 percent of the calcium hypochlorite dihydrate crystals obtained by the process of this invention may be large platelets or cohesive agglomerates, there is a minimal amount of paste liquor entrained in the crystals during the separation in cake separator 3, even when filtered on a drum filter. The crystals are easier to separate from the paste liquor in cake separator 3 and are easier to dry in dryer 4 than crystals produced by conventional calcium hypochlorite techniques. In prior art techniques, more expensive high speed titanium centrifuges are necessary to obtain crystals of equivalent purity.

Moist cake from cake separator 3 contains from about 40 to about 60 percent by weight of $Ca(OCl)_2$, from about 2 to about 15 percent by weight of NaCl, and from about 40 to 50 percent by weight of water. This moist cake may be used directly in the treatment of water systems such as swimming pools and the like, but is generally dried and stored prior to use. The moist cake is dried by known means, for example, using a spray dryer, turbodryer or vacuum dryer where the appropriate temperature ranges are employed to reduce the water content to the desired level. In the process of the present invention, the cake is dried, for example, in a turbodryer with hot air while maintaining the product temperature in the range from about 35° to about 110° C., and preferably from about 40° to about 95° C. to give a product having a calcium hypochlorite content from about 65 to about 85, a water content below about 10 percent by weight and the bulk of the remainder being sodium chloride.

Paste liquor from cake separator 3 generally has a sodium chloride concentration ranging from about 15 to about 22 percent, and preferably from about 17 to about 20 percent by weight, a calcium hypochlorite concentration ranging from about 7 to about 15 percent and preferably from about 8 to about 12 percent by weight, and a water content ranging from about 60 to about 75 percent and preferably from about 68 to about 73 percent by weight.

In one embodiment of the process of the present invention, a portion of the paste liquor may be recycled to mixing zone 1, if desired, to improve control of the chlorination and heat transfer in slurry chlorinator 2. Generally, from 0 to about 40 and preferably from about 0 to about 10 percent by weight of the paste liquor is recycled to mixing zone 1, the balance being conveyed to dibasic crystallizer 6.

As discussed above, paste liquor is reacted with a lime slurry in dibasic crystallizer 6 to produce dibasic calcium hypochlorite crystals. To produce crystals having improved filterability while recovering substantial amounts of the calcium hypochlorite values in the paste filtrate, the reaction in dibasic crystallizer 6 is carefully controlled with respect to the concentration of available chlorine and the total alkalinity.

To maintain the desired available chlorine concentration in the dibasic mother liquor dibasic crystallizer 6 is operated to maintain the oxidation-reduction potential of the dibasic calcium hypochlorite slurry in the range of from about 690 to about 705 millivolts at temperatures of 30° to 50° C. Where the oxidation-reduction potential of the reaction mixture is above about 705 millivolts, the calcium hypochlorite concentration of the mother liquor recovered from dibasic separator 7 is undesirably high. At oxidation-reduction potentials below about 690 millivolts, the separation rates of the slurry of dibasic calcium hypochlorite crystals in dibasic separator are significantly reduced.

Total alkalinity of the reaction mixture of paste liquor and lime within dibasic crystallizer 6 is maintained within the range of from about 2 to about 6, and preferably from about 3 to about 4 percent. Total alkalinity of the reaction mixture is provided by the dibasic calcium hypochlorite crystals, free lime and basic impurities present such as calcium carbonate, magnesium hydroxide, magnesium oxide, calcium oxide and the like. Where the total alkalinity is above about 6 percent, the presence of excessive amounts of free lime reduces the separation rate of the slurry in dibasic separator 7. Reduction of the total alkalinity below about 2 percent results in the formation of crystals of hemibasic calcium hypochlorite and an undesirably high concentration of available chlorine in the mother liquor recovered from dibasic separator 7.

The temperature of the reaction mixture of paste liquor and lime in dibasic crystallizer is maintained within the range of from about 30° to about 50° C., preferably at from about 35° to about 42° C., and more preferably at from about 40° to about 42° C. Operating the dibasic crystallizer within these temperature ranges results in the growth of dibasic calcium hypochlorite crystals which are readily filtered, are stable, and where "fines" are minimized. When temperatures below about 30° C. are employed in the dibasic crystallizer, the crystals grown are very fine and result in low separation rates in dibasic separator 7. At temperatures above about 45° C., the crystals are readily filtered but the rate of decomposition increases resulting in the formation of excessive amounts of calcium chlorates. The slurry, dibasic calcium hypochlorite, produced in dibasic crystallizer 6 has a solids content in the range of from about 7 to about 10 percent.

The slurry of dibasic calcium hypochlorite crystals from dibasic crystallizer 6 is fed to dibasic separator 7 where dibasic calcium hypochlorite crystals are separated from a dibasic mother liquor. Dibasic separator 7 is a filter, centrifuge, or any other suitable solid-liquid separating device capable of separating a slurry or moist cake of dibasic calcium hypochlorite crystals from the aqueous solution of dibasic calcium hypochlorite and sodium chloride. The dibasic calcium hypochlorite crystals are preferably separated as a slurry in the mother liquor containing from about 60 to about 70 percent solids. As stated above, this slurry is recycled to mixing zone 1 and/or lime chlorinator 8.

In one embodiment, prior to feeding the slurry of dibasic calcium hypochlorite crystals to dibasic separator 7, all or a portion of the slurry is passed through a fines collector such as a centrifuge or hydroclone to remove any fine crystals present in the slurry. These fine crystals are recycled to dibasic crystallizer 6.

Dibasic mother liquor recovered from dibasic separator 6 is an aqueous solution containing sodium chloride and small amounts of dibasic calcium hypochlorite, i.e., from about 0 to about 0.1 percent by weight of $Ca(OCl)_2 \cdot 2Ca(OH)_2$. As stated above, dibasic mother liquor may be used as the aqueous solution in forming the lime slurries used in the process. Dibasic mother liquor may also be treated with sodium hydroxide to recover the remaining hypochlorite values as lime. The lime produced is highly active and contains above 95% $Ca(OH)_2$. The dilute slurry of lime produced by the reaction of sodium hydroxide with dibasic mother liquor is fed to a separator to separate a lime slurry from a sodium chloride solution. The lime slurry may be recycled to mixing zone 1 and/or mixing zone 5. The sodium chloride solution recovered may be recycled as the solution in forming lime slurries used in the process. Where possible, the sodium chloride solution, essentially free of calcium hypochlorite and calcium hydroxide can be fed as brine to electrolytic cells for the production of chlorine and alkali metal hydroxides. The salt solution may also be discarded, without further treatment, to water bodies without resulting in undesired pollution.

The novel process of the present invention provides an efficient method of recovering calcium hypochlorite values from process liquors. This is accomplished while reducing energy costs expended in the recovery of waste solutions containing $Ca(OCl)_2$ using the processes of U.S. Pat. Nos. 3,895,099 and 4,196,094. The energy savings results from eliminating the need to evaporate substantial amounts of water, i.e., over 1000 lbs. per ton of calcium hypochlorite product. The process of the present invention further provides rapid recovery of dibasic calcium hypochlorite for reuse in a neutral calcium hypochlorite process by optimizing crystal growth conditions and separation rates. Raw material costs are substantially reduced as the high purity lime required for most conventional commercial calcium hypochlorite processes need not be used and lime from virtually any source can be employed.

The process of the present invention provides operating controls such that the available chlorine content in the mother liquor of the dibasic calcium hypochlorite slurry can be maintained between about 3.0 and 3.5 percent; the dibasic calcium hypochlorite crystals produced can be maintained at from about 300 to about 1000 microns in size; and excess lime held to a minimum. These controls achieve high filtration rates for the dibasic calcium hypochlorite slurry, for example, of from about 100 to about 120 gallons per hour per square foot of filter medium. This compares to filtration rates of 10 to 12 gallons per hour per square foot of filter medium employing processes of the prior art.

The following example is presented to illustrate the invention more fully. All parts and percentages are by weight unless otherwise specified.

EXAMPLE

Using the process illustrated in FIG. 1, 248 parts of lime were slurried in 1092 parts of a 32% sodium hypochlorite solution in a mixing tank provided with an agitator. The lime contained 95 to 98 parts by weight $Ca(OH)_2$. To the mixing tank was added a slurry prepared from 415 parts of a filter cake of dibasic calcium hypochlorite crystals in 650 parts of water. In mixing zone 1, the mixture was blended to form a mixing zone slurry of lime and dibasic calcium hypochlorite crystals. The slurry was fed continuously to a cooled chlorinating vessel equipped with an agitator. Chlorine gas (313 parts) was continuously fed to the chlorinator and 2718 parts of a neutral calcium hypochlorite paste were produced. The feed rate of the chlorine gas and mixing zone slurry to the chlorinator were adjusted to produce a paste having a total alkalinity of 0.4 percent.

The neutral calcium hypochlorite paste was conveyed to a filter which separated the paste into 1352 parts of a moist cake of neutral calcium hypochlorite dihydrate and 1366 parts of paste liquor. The moist cake containing 48% $Ca(OCl)_2$, 8% NaCl and 45% water, was transferred to a dryer. A dried neutral calcium hypochlorite product was recovered from the dryer containing 73 percent $Ca(OCl)_2$, 21.6 percent NaCl and 6.4 percent $H_2O$.

The paste liquor, an aqueous solution of dibasic calcium hypochlorite and sodium chloride, was fed to a tank, a jacketed crystallizer equipped with an agitator. The tank had an external recycle loop containing a temperature sensing element and an oxidation-reduction potential sensor. Lime (99 parts) was slurried in 2672 parts of dibasic calcium hypochlorite mother liquor from a previous step and reacted with the 1366 parts of paste liquor in the continuous crystallizer to form 4137 parts of a dibasic calcium hypochlorite slurry. This slurry was continuously filtered on a rotary drum filter to product 565 parts of moist dibasic calcium hypochlorite cake and 3573 parts of the dibasic calcium hypochlorite mother liquor. From this 3573 parts of dibasic mother liquor, 2672 parts were recycled to prepare the lime slurry mentioned above and 900 parts were further treated to prepare a brine for electrolytic cells in a chlor-alkali plant. Addition of the paste liquor and lime slurry to the crystallizer were controlled to maintain the oxidation-reduction potential of the reaction mixture at a range of 692 to 698 millivolts. Heating fluid circulating through the jacket maintained the temperature in the crystallizer at 40° C. A slurry of dibasic calcium hypochlorite crystals was produced in the crystallizer. The slurry was fed to a filter which separated a moist cake of dibasic calcium hypochlorite crystals from a mother liquor containing 17.3 percent NaCl, 3.6 percent $Ca(OCl)_2$ and having 0.1–0.2 percent total alkalinity. The moist cake of dibasic calcium hypochlorite crystals was recycled to the mixing tank to prepare additional mixing zone slurry.

What is claimed is:

1. A process for producing neutral calcium hypochlorite which comprises:
    (a) admixing lime, an alkali metal hypochlorite and dibasic calcium hypochlorite crystals in a mixing zone to form a mixing zone slurry;

(b) reacting said mixing zone slurry with chlorine to form a paste of neutral calcium hypochlorite;
(c) separating said paste into a cake of neutral calcium hypochlorite and a paste liquor;
(d) reacting said paste liquor with a slurry of lime in a crystallizer to form a slurry of dibasic calcium hypochlorite crystals in a mother liquor while maintaining an oxidation reduction potential in the range of from about 690 to about 705 millivolts;
(e) separating said crystals of dibasic calcium hypochlorite crystals from said dibasic mother liquor; and
(f) recycling said dibasic calcium hypochlorite crystals to said mixing zone.

2. The process of claim 1 in which the total alkalinity of said slurry of dibasic calcium hypochlorite is maintained at from about 2 to about 6 percent.

3. The process of claim 2 in which a portion of said dibasic calcium hypochlorite mother liquor is mixed with lime to form a lime slurry and said lime slurry fed to said mixing zone.

4. The process of claim 2 in which said slurry of dibasic calcium hypochlorite is maintained at a temperature of from about 30° to about 50° C.

5. The process of claim 4 in which lime is admixed with a portion of said recycle dibasic calcium hypochlorite slurry and reacted with said paste liquor.

6. The process of claim 4 in which said lime is admixed with a portion of said dibasic calcium hypochlorite mother liquor and reacted with said paste liquor.

7. The process of claim 1 in which lime is slurried in a liquid selected from the group consisting of water, alkali metal chloride brines, and dibasic calcium hypochlorite mother liquor.

8. The process of claim 6 in which said slurry of dibasic calcium hypochlorite is maintained at a temperature of from about 35° to about 45° C.

9. The process of claim 6 in which said dibasic calcium hypochlorite slurry is added to an elutriator to separate insoluble impurities from dibasic calcium hypochlorite crystals.

* * * * *